Nov. 12, 1968 M. TISCHLER 3,410,949
PLASTIC EMBEDDED COLOR-CODED PRINTED CIRCUIT
Original Filed June 14, 1965
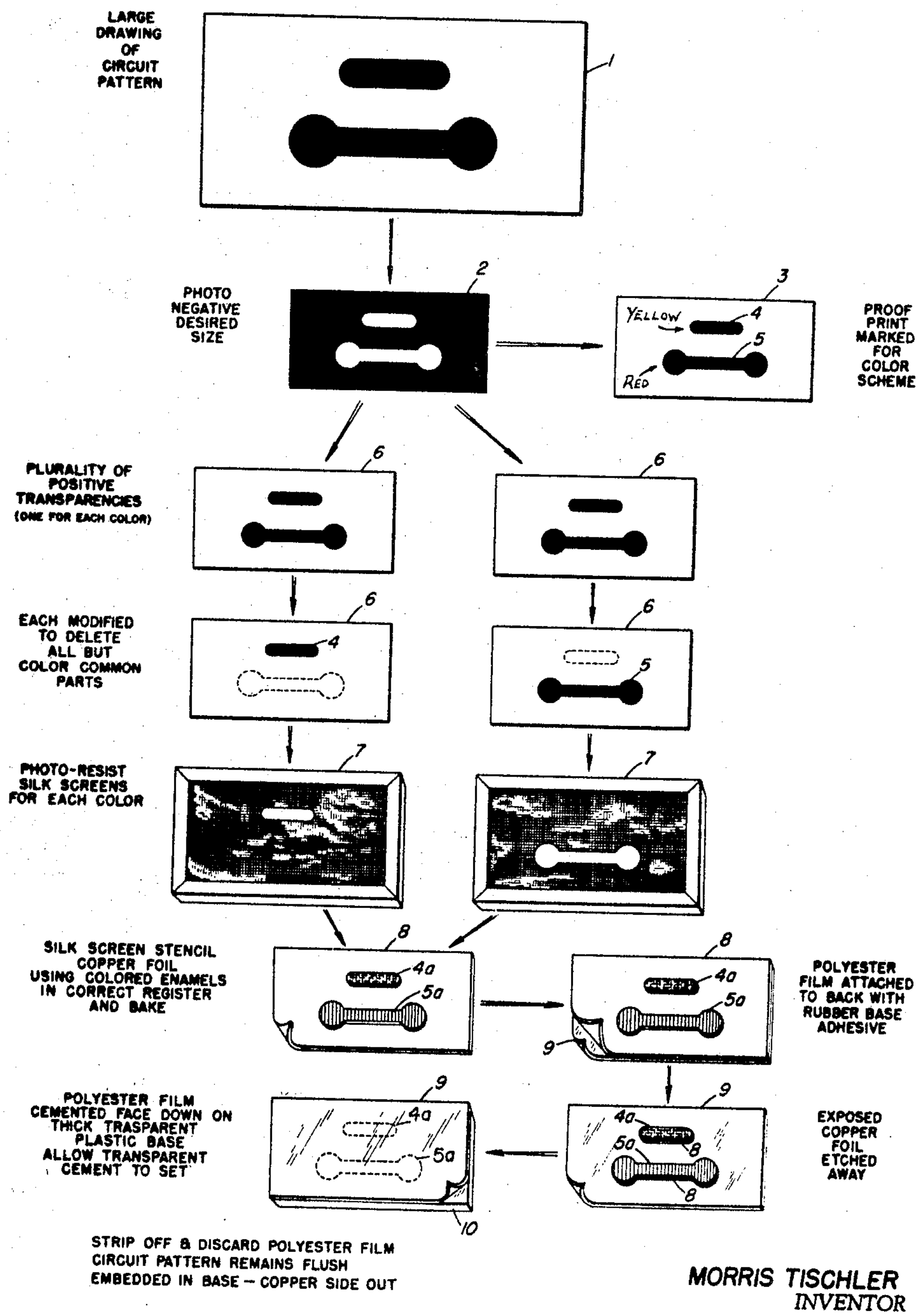
MORRIS TISCHLER
INVENTOR
BY Walter G. Finch
ATTORNEY 3,410,949
Patented Nov. 12, 1968

3,410,949

PLASTIC EMBEDDED COLOR-CODED PRINTED CIRCUIT

Morris Tischler, 3100 Shelburne Road, Baltimore, Md. 21208

Continuation of application Ser. No. 551,370, May 19, 1966, which is a division of application Ser. No. 470,-266, June 14, 1965, now Patent No. 3,282,755, dated Nov. 1, 1966. This application Oct. 16, 1967, Ser. No. 677,837
4 Claims. (Cl. 174—68.5)

ABSTRACT OF THE DISCLOSURE

This invention relates to a new combination of a transparent baseboard and a flush-embedded bare metal wiring pattern. The inner side of the wiring pattern is provided with a baked enamel coating in colors to identify portions thereof. These portions are visible through the baseboard from one side and other side is available for electrical connection to the identified portions.

This patent application is a continuation of U.S. patent application Ser. No. 551,370 filed by applicant on May 19, 1966, entitled, "Plastic Embedded Color-Coded Printed Circuit," now abandoned, which, in turn was a division of Ser. No. 470,266, filed June 14, 1965, now U.S. Letters Patent No. 3,282,755, issued Nov. 1, 1966, to applicant for "Plastic Embedded Color-Coded Printed Circuit."

This invention relates to electrical conductors and more particularly it pertains to a printed circuit article.

It is common practice in electronic apparatus to use colored wiring to facilitate the tracing of individual circuits. With the advent of printed circuitry, this color coding becomes even more desirable because of the involved paths by which circuits are routed in order to avoid crossovers. Then too, it is of great importance in the educational field to be able to explain circuit wiring of exhibition apparatus by reference to colors.

Another object of this invention is to provide a circuit board having a solderable flush embedded printed wiring pattern.

Still another object of this invention is to provide a protected printed circuit board which is both functional and decorative.

Yet another object of this invention is to provide colored printed circuit elements which are readily transferable to base structure thus protecting the base structure from etching fluids.

And still another object of the invention is to provide a circuit base for electronic apparatus which is easily traced by colors observable from the reverse side.

These and other objects and attendant advantages of this invention will become more readily apparent and understood from the following detailed specification and single sheet of accompanying drawings.

As shown in the drawing, the desired circuit is first laid out by an artist on a large scale drawing 1. A photonegative 2 is then made to the desired size of this large scale drawing 1.

From the photonegative, a proof print 3 is taken as well as a plurality of contact positive transparencies 6 equal in number to the different colors to be used.

The proof print 3 is marked as a guide to the colors desired, for example, the character image 4 to be yellow and the character image 5 to be red. Each positive transparency 6 is mechanically modified to delete all but the desired color common parts or characters.

Next, by a well-known photo-resist process, silk screen stencils 7 are made from each color-common modified positive transparency 6. Then using these stencils 7 sequentially in correct register colored enamel characters such as yellow enamel character **4*a* and red enamel character 5*a* are applied to a common sheet of degreased copper foil 8** and baked for one-half hour at 140 degrees F.

A preferred enamel for this purpose includes a catalyst type silk screen ink with an added epoxy resin bonding agent. For example, uniglaze enamel with bonding agent Omega Research No. 803 has been found to be very successful. The degreasing of the copper foil 8 is best carried out in an ammonium persulphate solution which is effective in removing organic contamination.

A thin polyester film 9, such as Mylar, is now attached to the back of the stenciled and baked foil 8 using a rubber base adhesive and the assembly placed in an etching bath. All exposed copper is then dissolved away to the adhesive covered polyester film 9.

The yellow and red colored characters **4*a* and 5*a* remain unchanged but now have an underlying replica of themselves of copper foil 8 and are still positioned relative to each other on the polyester film 9**.

This polyester film 9 is now cemented, character face down, onto a thick transparent plastic base 10 with a transparent cement suited to the plastic base material. For example, if Plexiglas is chosen, the most suitable cement would be Masco acrylic resin No. MC18.

After the cement has set and hardened, the polyester film 9 is stripped off and discarded. The characters **4*a* and 5*a* will be found flush embedded in the base 10 with the copper foil side exposed. The color side of each character 4*a* and 5*a*** clearly shows through the transparent plastic and is protected against smudging from the fingers of a student or repairman.

The customary operations of drilling, eyeletting and soldering-in of components may be carried out through well known techniques for ordinary printed circuits. It should be noted that the plastic base 10 is never exposed to etching fluids, thus preserving its dielectric property at a high level.

Obviously many modifications and variations of the present invention are possible in light of the above teachings. It is, therefore, to be understood that within the scope of the appended claims the invention may be practiced otherwise than as specifically described.

What is claimed is:

1. In a printed circuit assembly having a bare metal wiring pattern flush embedded in, and extensively exposed to electrical contact at, one side of a transparent board, the improvement comprising: a substantially flat layer of colored dielectric material patterned in register with the wiring pattern and the transparent board, whereby the colored dielectric material is exposed to view through the transparent board and substantially concealed by said wiring pattern is uniformly secured to said board.

2. In a device as recited in claim 1, wherein said colored dielectric material is adhesively attached to said transparent board and wiring pattern respectively whereby said wiring pattern is uniformly secured to said board.

3. In a device as recited in claim 2, wherein said colored dielectric material is enamel baked onto said wiring pattern and attached to said transparent board by transparent adhesive.

4. In a device as recited in claim 3, wherein the transparent board has a plane surface, and that part of said board in which said wirring and dielectric patterns are flush embedded comprises a layer of transparent adhesive affixed to said plane surface.

References Cited

UNITED STATES PATENTS 2,066,876 1/1937 Carpenter et al.

OTHER REFERENCES

"Printed Circuit Techniques," National Bureau of Standards Circular 468, publ. by U.S. Department of Commerce, Nov. 15, 1947, p. 24.

DARRELL L. CLAY, *Primary Examiner.*

UNITED STATES PATENT OFFICE
CERTIFICATE OF CORRECTION

Patent No. 3,410,949 November 12, 1968

Morris Tischler

It is certified that error appears in the above identified patent and that said Letters Patent are hereby corrected as shown below:

Column 2, line 57, "by said wiring pattern is uniformly secured to said board." should read -- from view oppositely by the wiring pattern. --.

Signed and sealed this 3rd day of March 1970.

(SEAL)
Attest:

Edward M. Fletcher, Jr.
Attesting Officer

WILLIAM E. SCHUYLER, JR.
Commissioner of Patents